(12) United States Patent
Tyrrell et al.

(10) Patent No.: US 7,243,729 B2
(45) Date of Patent: Jul. 17, 2007

(54) SUBSEA JUNCTION PLATE ASSEMBLY RUNNING TOOL AND METHOD OF INSTALLATION

(75) Inventors: Charles Tyrrell, Houston, TX (US); Christopher Mancini, Tomball, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 11/253,145

(22) Filed: Oct. 18, 2005

(65) Prior Publication Data

US 2006/0090898 A1  May 4, 2006

Related U.S. Application Data

(60) Provisional application No. 60/620,212, filed on Oct. 19, 2004.

(51) Int. Cl.
   *E21B 29/12* (2006.01)
(52) U.S. Cl. .............. 166/338; 166/365; 166/373; 251/1.1; 251/30.01
(58) Field of Classification Search ........... 166/351, 166/338, 344, 363, 364, 373, 368; 137/236.1, 137/260, 825, 635, 554, 557; 251/1.1, 1.3, 251/30.01
See application file for complete search history.

(56) References Cited

U.S. PATENT DOCUMENTS

| | | | | |
|---|---|---|---|---|
| 3,586,048 A | | 6/1971 | Arnold | |
| 3,894,560 A | * | 7/1975 | Baugh | 137/606 |
| 3,921,500 A | * | 11/1975 | Silcox | 91/4 R |
| 4,035,005 A | | 7/1977 | DeVincent et al. | |
| 4,052,703 A | * | 10/1977 | Collins et al. | 714/2 |
| 4,497,369 A | * | 2/1985 | Hurta et al. | 166/368 |
| 4,566,489 A | | 1/1986 | Knapp et al. | |
| 4,730,677 A | | 3/1988 | Pearce et al. | |
| 4,943,187 A | | 7/1990 | Hopper | |
| 5,265,980 A | | 11/1993 | Lugo et al. | |
| 5,333,691 A | | 8/1994 | Dean et al. | |
| 5,398,761 A | * | 3/1995 | Reynolds et al. | 166/344 |
| 5,466,017 A | | 11/1995 | Szabo et al. | |
| 5,743,670 A | | 4/1998 | Ader | |
| 5,794,701 A | * | 8/1998 | Cunningham et al. | 166/341 |
| 6,032,742 A | * | 3/2000 | Tomlin et al. | 166/345 |
| 6,142,233 A | * | 11/2000 | Wilkins | 166/339 |
| 6,161,618 A | * | 12/2000 | Parks et al. | 166/351 |
| 6,484,806 B2 | * | 11/2002 | Childers et al. | 166/351 |
| 6,558,537 B1 | | 5/2003 | Clement et al. | |
| 6,622,799 B2 | * | 9/2003 | Dean | 166/381 |
| 6,907,932 B2 | * | 6/2005 | Reimert | 166/341 |
| 2001/0003288 A1 | * | 6/2001 | Clayton et al. | 137/884 |

OTHER PUBLICATIONS

Pejavar, et al., "Driverless Maintained Cluster (DMaC) Subsea Production System", OTC 6720, Offshore Technology Conference, 1991, 209-220.

* cited by examiner

*Primary Examiner*—Thomas A Beach
(74) *Attorney, Agent, or Firm*—Duane Morris LLP

(57) ABSTRACT

The invention relates to a running tool for subsea junction plate assembly installation. The invention further relates to a method for installing a junction plate assembly using the running tool of the present invention.

22 Claims, 14 Drawing Sheets

SUBSEA JUNCTION PLATE ASSEMBLY RUNNING TOOL AND METHOD OF INSTALLATION

PRIORITY INFORMATION

This continuation in part application claims the benefit of U.S. Provisional Application No. 60/620,212, filed on Oct. 19, 2004. The entire disclosure of this provisional application is incorporated herein by reference.

FIELD OF THE INVENTION

The invention relates to a running tool for subsea junction plate assembly installation. The invention further relates to a method for installing a junction plate assembly using the running tool of the present invention.

BACKGROUND OF THE INVENTION

Junction plate assemblies comprising a fixed junction plate and a moveable junction plate are used subsea to connect an array of multiple fluid or electrical couplers. The term "fixed junction plate" as used herein means a junction plate whose spatial location is fixed. The term "moveable junction plate" as used herein means a junction plate whose spatial location is not fixed. Forces of up to 1000 pounds per coupler to make a suitable junction plate connection are common.

Once the junction plates are connected, a locking mechanism is required with prior art junction plate assemblies to prevent the plates from disconnecting, while a force of up to 1000 pounds per coupler is being applied. To disconnect the junction plates, a reverse force of up to 1000 pounds per coupler is required to overcome the locking force on each coupler.

Current junction plate assemblies require large mechanisms to apply the forces needed to couple and decouple the junction plates. One type of coupling or decoupling mechanism used with prior art junction plates are lead screws with acme threads. Such mechanisms are expensive. They are typically used for periods of less than one hour during the multi-year lifetime of the junction plate assembly. Current junction plate installation using lead screws with acme threads also entails the use of torque tools involving rotary motion to drive a threaded rod, thereby producing a linear motion for couplers on the junction plate assembly to be "made up."

The present invention provides the advantage of a reusable running tool which can be hydraulically powered to provide the forces necessary to couple and decouple a junction plate assembly. The running tool can be disconnected from the junction plate assembly once a desired coupling is achieved. This permits the running tool to be used repeatedly to couple or decouple different junction plate assemblies. This provides the advantage of allowing the junction plate assemblies to be manufactured without the expense of a prior art coupling mechanism.

DETAILED DESCRIPTION OF THE PREFERRED EMBODIMENTS

Figure 1B:
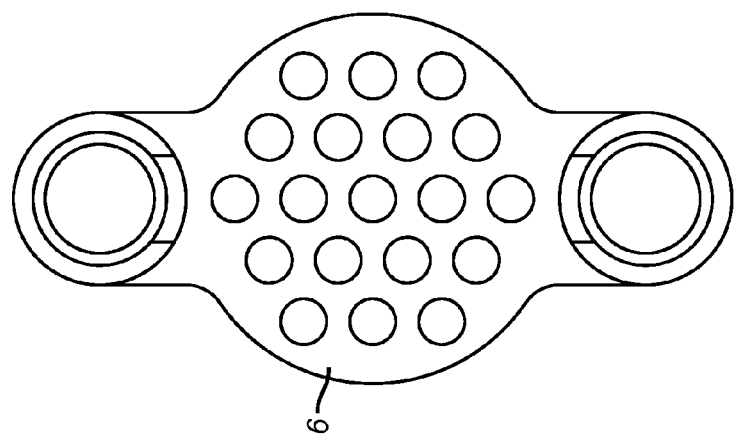
FIG. 1B is a front view of a fixed junction plate of FIG. 1A.
Figure 1A:
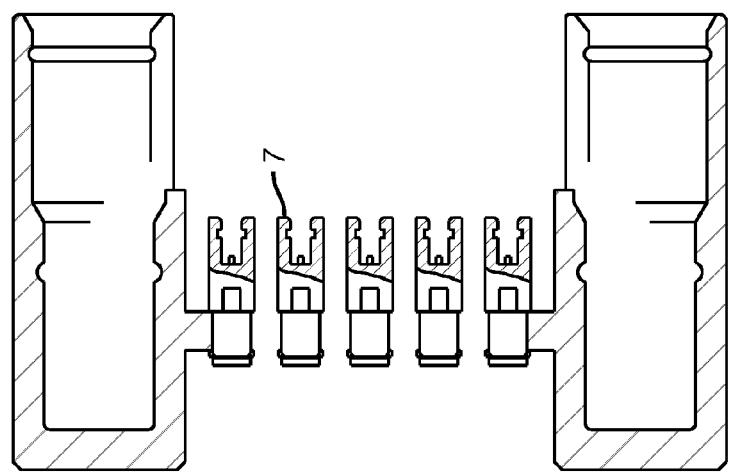
FIG. 1A is a side view of a fixed junction plate suitable for use with a running tool of the present invention.
Figure 2B:
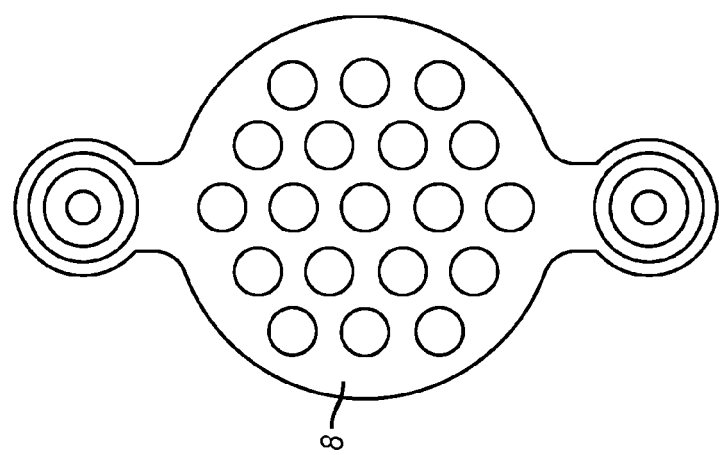
FIG. 2B is a front view of a fixed junction plate of FIG. 2A.
Figure 2A:
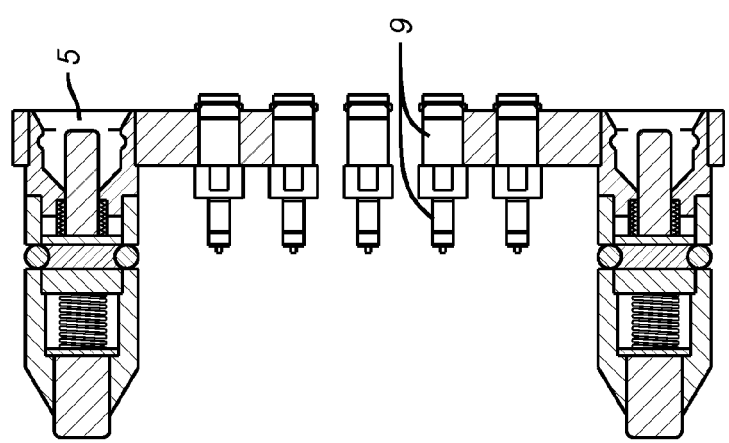
FIG. 2A is a side view of a moveable junction plate suitable for use with a running tool of the present invention.

The present invention is directed toward a junction plate assembly running tool which may be used to attach a moveable junction plate to a fixed junction plate. A fixed junction plate 6 suitable for use with the present invention is shown in FIGS. 1A and 1B. The fixed junction plate comprises coupling members 7. A moveable junction plate 8 suitable for use with the present invention is shown in FIGS. 2A and 2B. The moveable junction plate comprises coupling members 9 and running tool receptacle 5. The coupling members of the fixed and moveable junction plates typically engage each other in a male and female coupling relationship. The male coupling member may be placed on either junction plate and the female coupling member placed on the other junction plate.

Figure 3B:
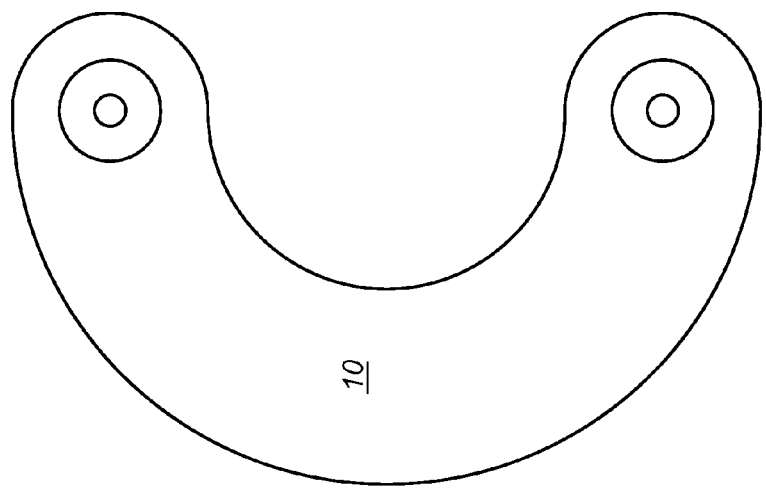
FIG. 3B is a front view of a first preferred embodiment of the running tool of the present invention.
Figure 3A:
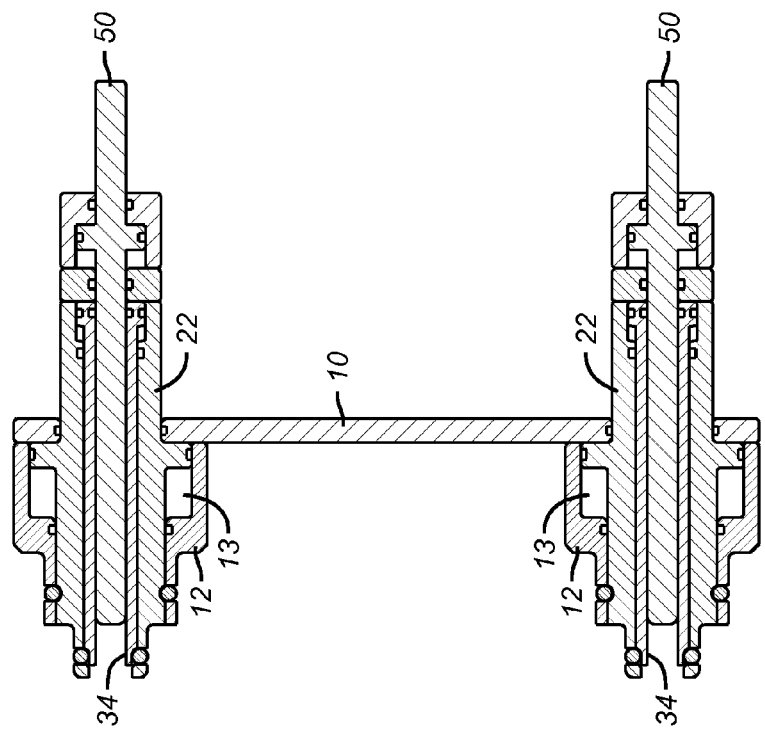
FIG. 3A is a side view of a first preferred embodiment of the running tool of the present invention.
Figure 3C:
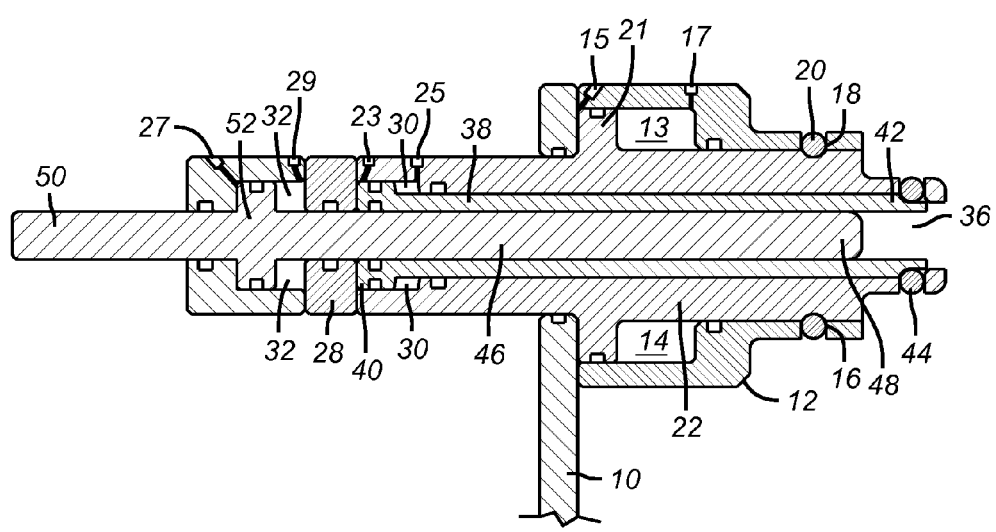
FIG. 3C is a side view of a second preferred embodiment of the running tool of the present invention.

A first preferred embodiment of the running tool of the present invention is shown in FIG. 3C. This embodiment comprises a running tool housing 12 comprising a longitudinal outer lock sleeve channel 14, an inner locking member port 16, and an outer locking ball port 18, a first fluid channel 15 and a second fluid channel 17. The housing 12 is an outer body. Those skilled in the art will appreciate that outer bodies or housings may be constructed in a variety of shapes and sizes, depending, in part, upon the size and shape of the junction plates with which the running tool is to be used. The outer lock sleeve channel 14 comprises a first pressure volume 13. A male locking member 20 is moveably mounted in the locking member port, as shown in FIG. 3C.

This embodiment of the running tool further comprises an outer lock sleeve 22 moveably mounted in said longitudinal outer lock sleeve channel and comprising a plate lock sleeve channel 24, a pressurization region 26, and a radial reducer region 28 extending radially into said pressurization region to define a proximal pressure chamber 30 and a distal pressure chamber 32. The outer lock sleeve further comprises a first pressurization lip 21 extending into the first pressure volume between the first and second fluid channels. The first proximal pressure chamber 30 comprises a first fluid port 23 and a second fluid port 25. The first distal pressure chamber 32 comprises a third fluid port 27 and a fourth fluid port 29. The outer lock sleeve 22 is a retractable coupling device attached to the outer body and adapted to be selectively coupled to a coupling receptacle in a moveable junction plate. Those skilled in the art will appreciate that a suitable retractable coupling device for use with the running tool of the present invention may take many varied embodiments, including a threaded member wherein rotational movement is translated to axial movement, or a finger type member with retractable lugs.

Additionally, this embodiment of the running tool comprises a plate lock sleeve 34 moveably mounted in said plate lock sleeve channel and comprising a piston channel 36, an extension end region 38 comprising a radial lip 40, and a tapered insertion end region 42 opposite the extension end region. At least one male locking member 44 is mounted on each tapered insertion end region. The tapered insertion end region 42 and the male locking member 44 constitute a locking mechanism that may be positioned to selectively lock the coupling device to a moveable junction plate.

Figure 6:
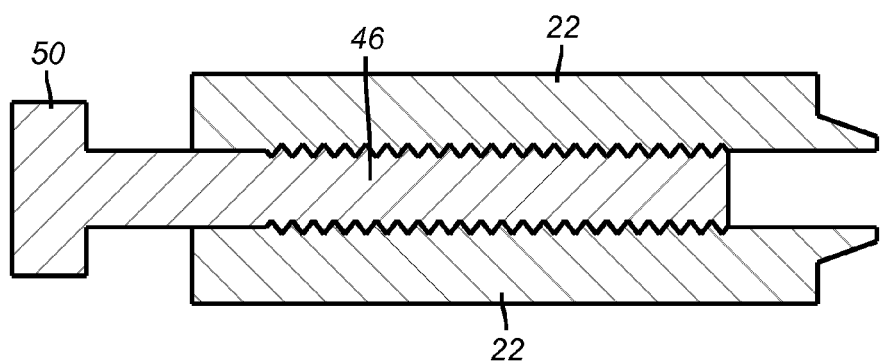
FIG. 6 is a side view of another preferred embodiment of a force translation system.

This embodiment of the running tool further comprises a piston 46 moveably mounted in said piston channel and comprising a proximal end region 48, a distal end region 50 opposite said proximal end region, and a bulge region 52 mounted in said first distal pressure chamber. In a preferred embodiment, the distal end region 50 is a torque receiving member, as shown in FIG. 6. The piston 46, the pressurization region, and the fluid ports, described above, constitute a force translation system adapted to receive an external force, such as pressurized fluid, and to apply such force to drive a moveable junction plate into a coupled relationship with a fixed junction plate. A suitable force translation system for use with the present invention may also include a threaded member which receives an external force applied rotationally along a radial arm to produce a torque which is translated through the use of a threaded member to produce longitudinal movement capable of driving a moveable junction plate into a coupled relationship with a fixed junction plate, as shown in FIG. 6.

Another preferred embodiment of the running tool of the present invention is depicted in FIGS. 3A and 3B. This embodiment is made up of two running tools of the type depicted in FIG. 3C connected by a central plate 10. The running tool embodiment depicted in FIGS. 3A and 3B comprises a first running tool housing and a second running tool housing that are configured as the running tool housing 12, described above. This embodiment of the running tool also comprises a first outer lock sleeve and a second outer lock sleeve that are configured as the outer lock sleeve 22, described above. This embodiment of the running tool further comprises a first plate lock sleeve and a second plate lock sleeve that are configured as the plate lock sleeve 34 described above. This embodiment of the running tool further comprises a first piston and a second piston that are configured as the piston 46, described above. The embodiment of the running tool shown in FIGS. 3A and 3B also comprises the fluid ports and fluid channels of the running tool depicted in FIG. 3C.

Another aspect of the present invention is a method to couple a moveable junction plate to a fixed junction plate, using a detachable running tool that may be removed after the junction plates are coupled to form a junction plate assembly. This method comprises inserting an attachment member of a running tool into a running tool receptacle on a moveable junction plate, as shown in Block 60 of FIG. 4 and in FIG. 5A. In the preferred embodiment of the running tool shown in FIG. 3A, the outer lock sleeve, plate lock sleeve, and piston function in combination as an attachment member of the running tool.

In one preferred embodiment, the inserting is accomplished using pressurized fluid. In the embodiment shown in FIG. 3A, the injection of pressurized fluid through a first fluid channel 15, first fluid port 23, and third fluid port 27 result in insertion of the running tool. In the preferred embodiment of the running tool shown in FIG. 3A, pressurized fluid is used to cause longitudinal movement of the plate lock sleeve and the piston. In another preferred embodiment, the inserting is accomplished using a source of pressurized hydraulic fluid mounted on an underwater vehicle as shown in Block 60 of FIG. 4. An underwater vehicle may be any vehicle suitable for traveling underwater, including a remotely operated vehicle ("ROV"), or an autonomous underwater vehicle ("AUV").

Figure 4:
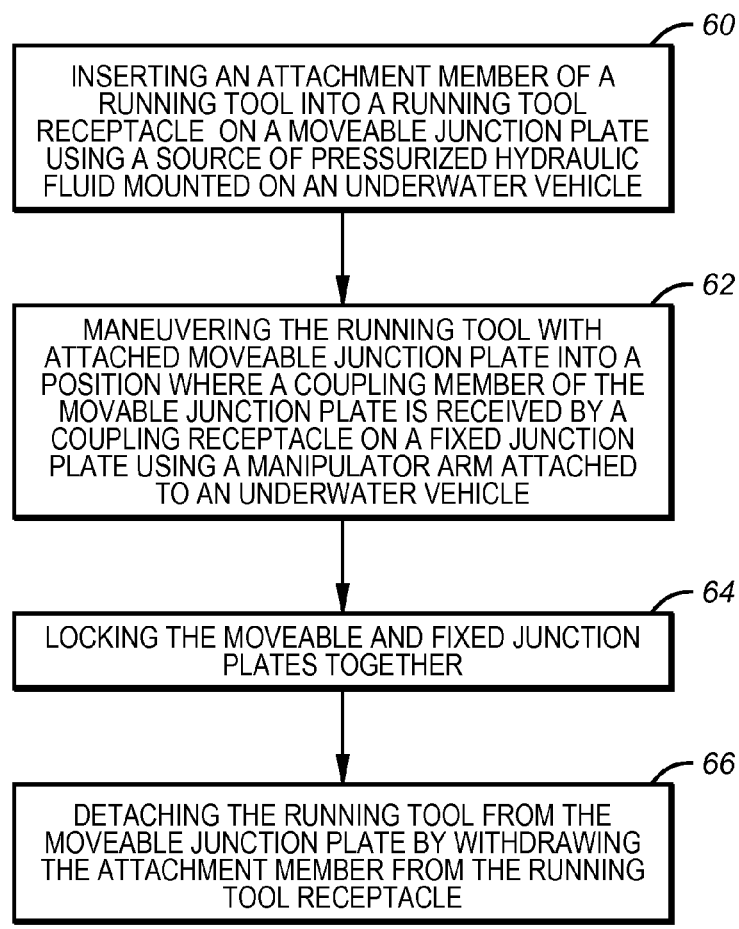
FIG. 4 is block diagram of a preferred method embodiment of the present invention
Figure 5A:
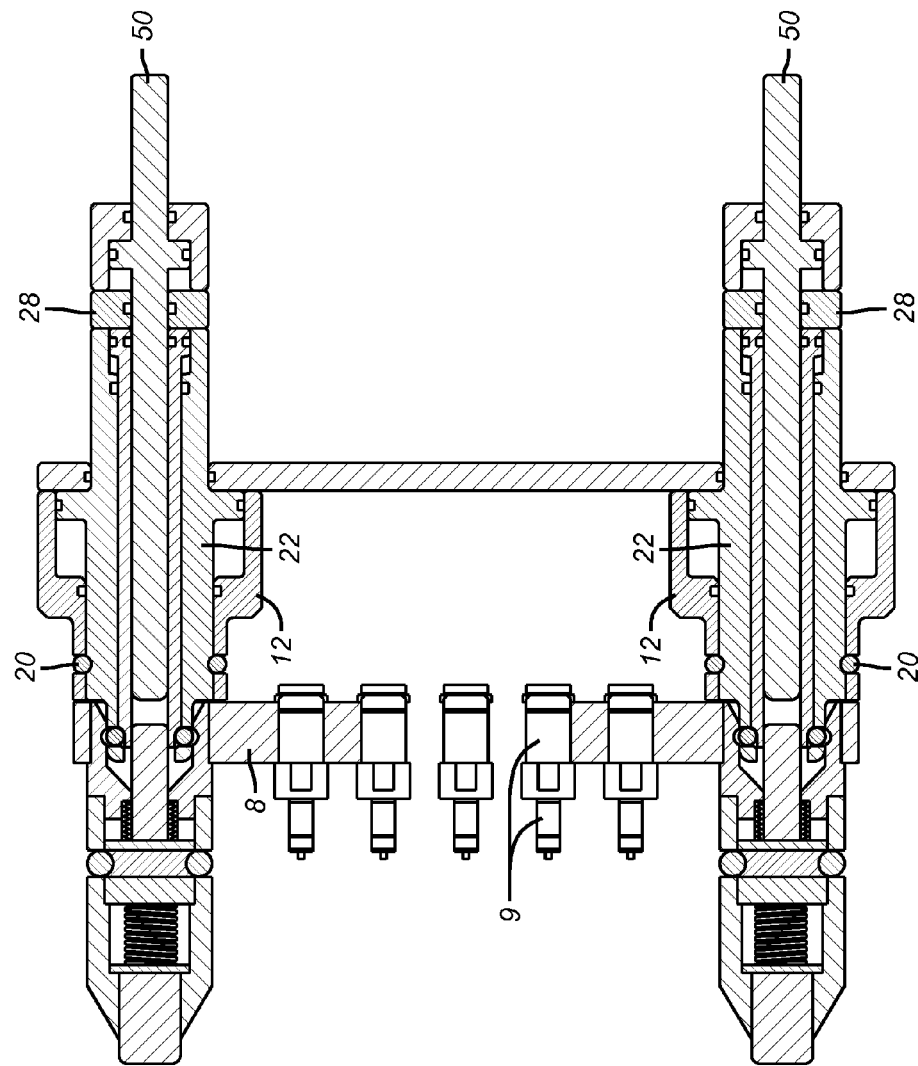
FIG. 5A is a side view of a first step of a method embodiment of the present invention using the running tool shown in FIGS. 3A-3B.
Figure 5A:
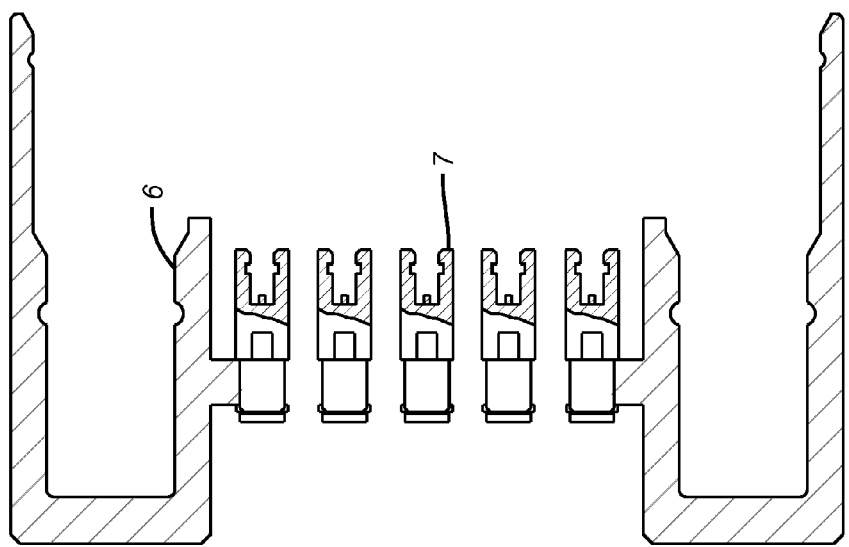
Figure 5B:
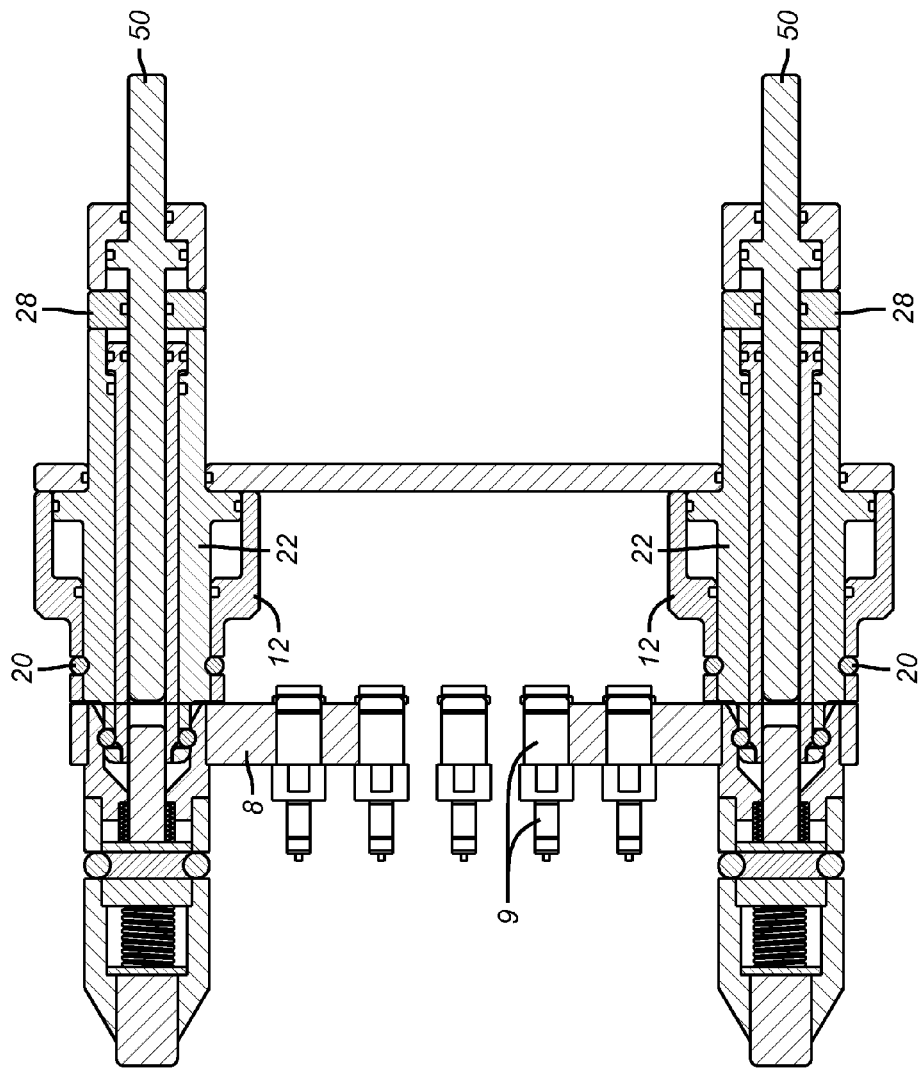
FIG. 5B is a side view of a second step of a method embodiment of the present invention using the running tool shown in FIGS. 3A-3B.
Figure 5B:
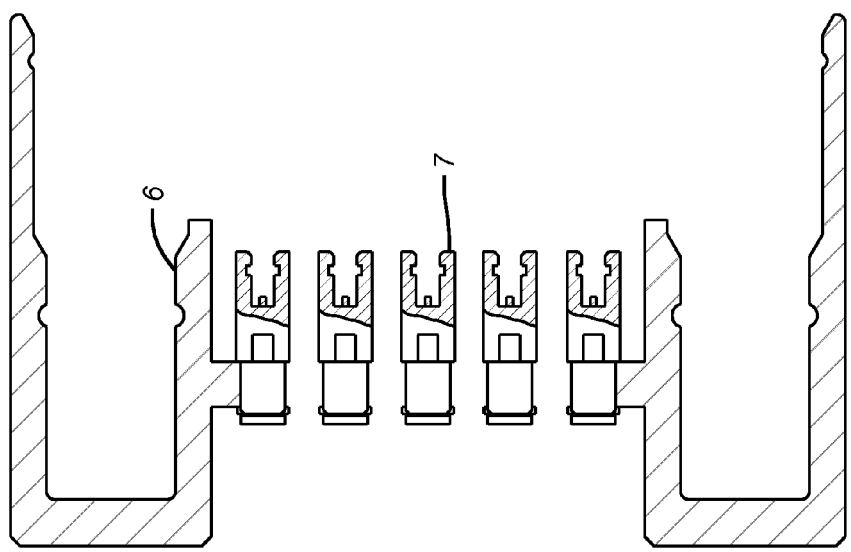
Figure 5C:
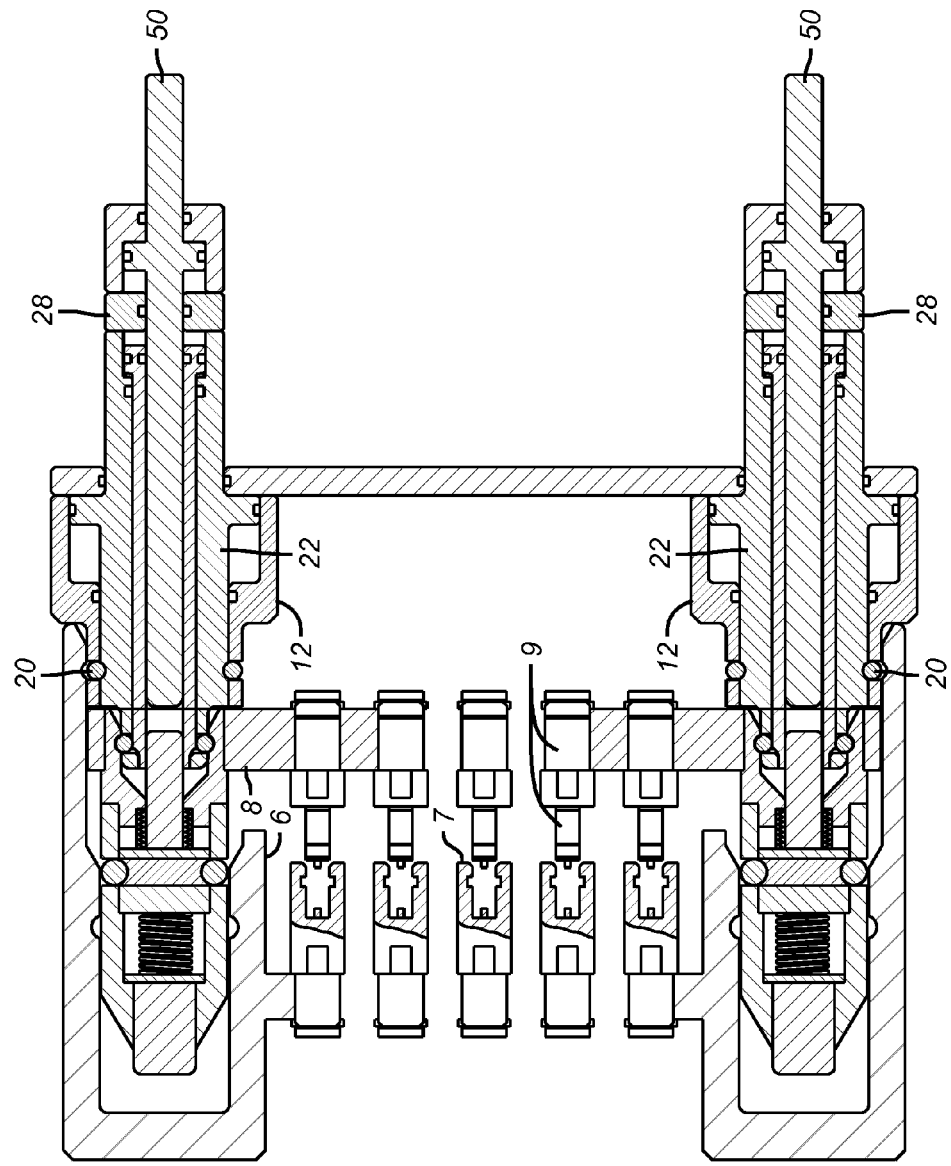
FIG. 5C is a side view of a third step of a method embodiment of the present invention using the running tool shown in FIGS. 3A-3B.

The method of the present invention further comprises maneuvering the running tool with attached moveable junction plate into a position where a coupling member of the moveable junction plate is received by a coupling receptacle of a fixed junction plate, as shown in Block 62 of FIG. 4 and in FIGS. 5B and 5C. The maneuvering may be over a short distance, such as a few inches, or over a longer distance, including a distance in excess of 100 feet. Additionally, the term "maneuvering", as used herein, encompasses movement along a straight path, a curved path, or a complex path comprising multiple turns and/or curves. In a preferred embodiment, the maneuvering is accomplished using a manipulator arm attached to an underwater vehicle as shown in Block 62 of FIG. 4.

Figure 5D:
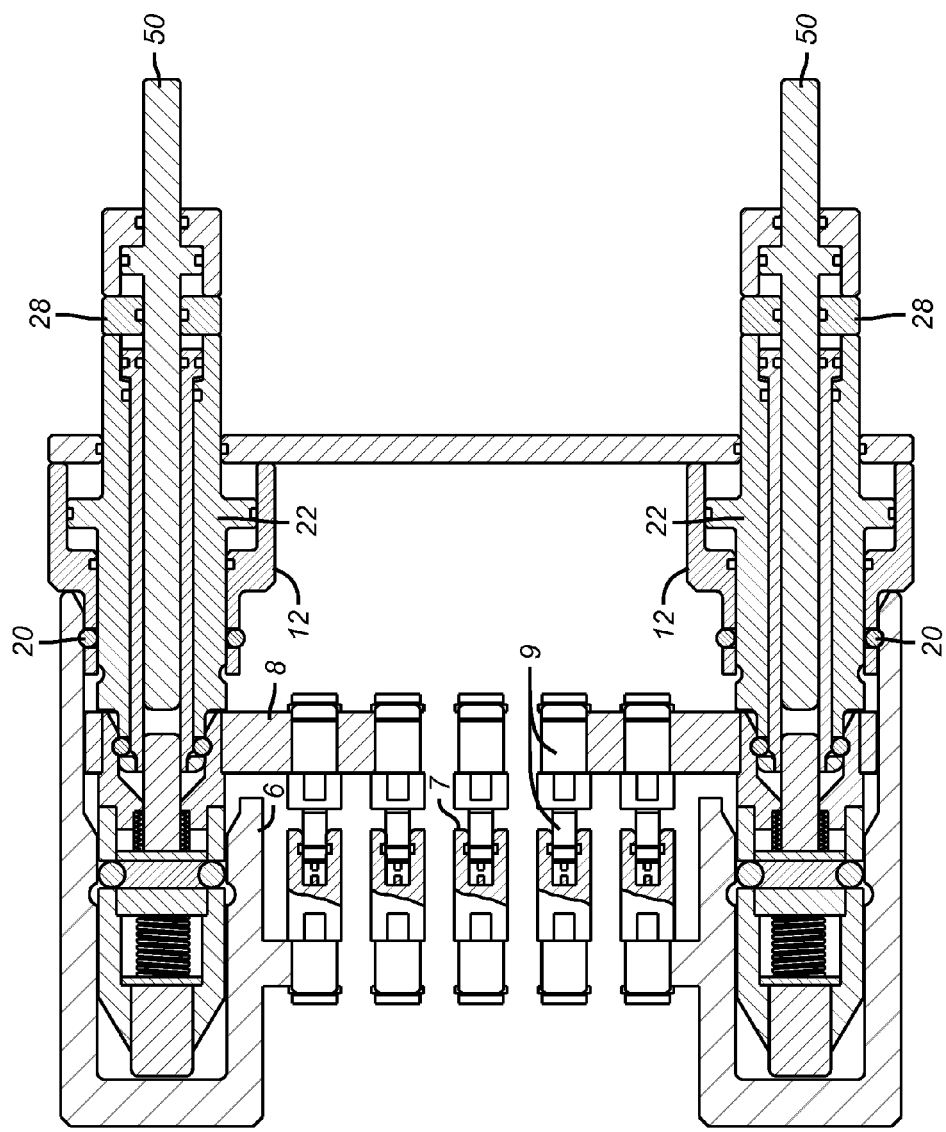
FIG. 5D is a side view of a fourth step of a method embodiment of the present invention using the running tool shown in FIGS. 3A-3B.
Figure 5E:
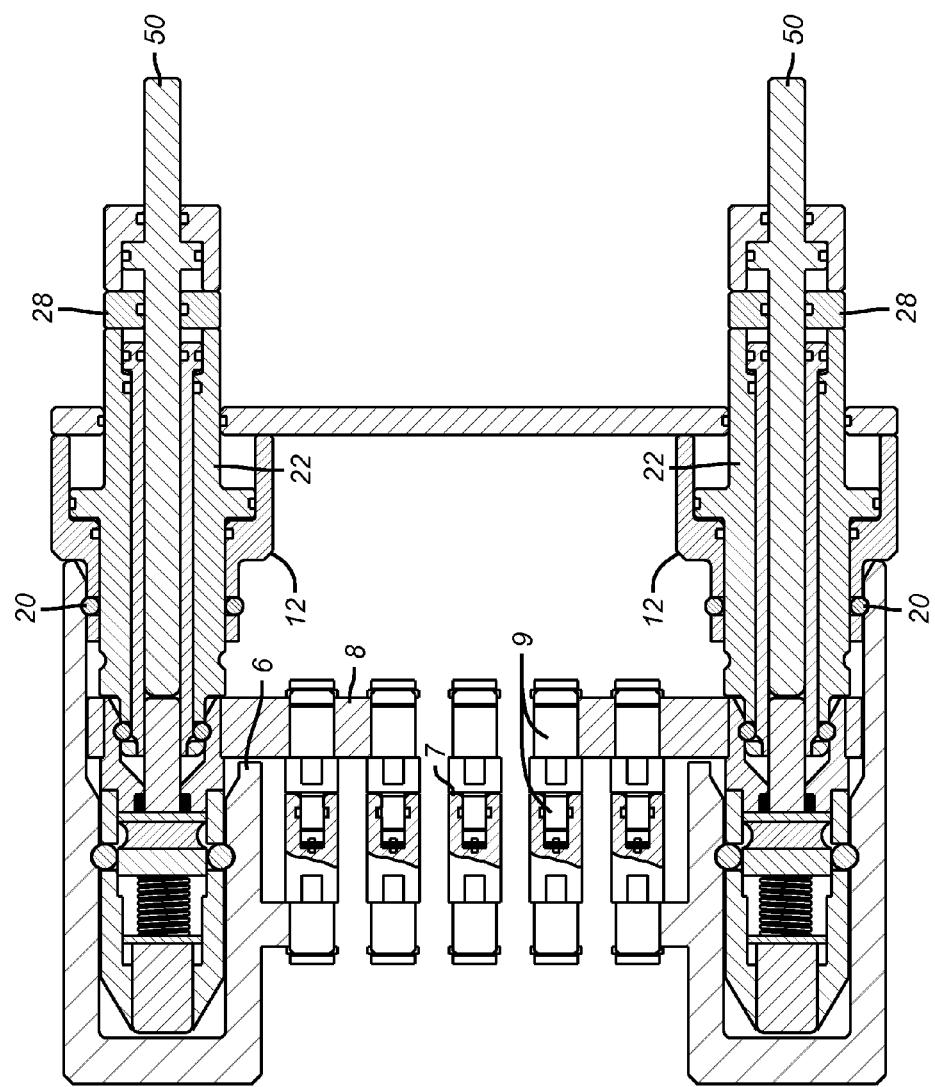
FIG. 5E is a side view of a fifth step of a method embodiment of the present invention using the running tool shown in FIGS. 3A-3B.

The method of the present invention further comprises locking the moveable and fixed junction plates together, as shown in Block 64 of FIG. 4 and in FIGS. 5D and 5E. This locking may be accomplished using methods well known to those in the subsea junction plate art, including the use of mating threaded members, or the use of detent mechanism. In a preferred embodiment, this locking can be accomplished using male and female threaded members or protruding male locking members retained within a female receptacle.

Figure 5F:
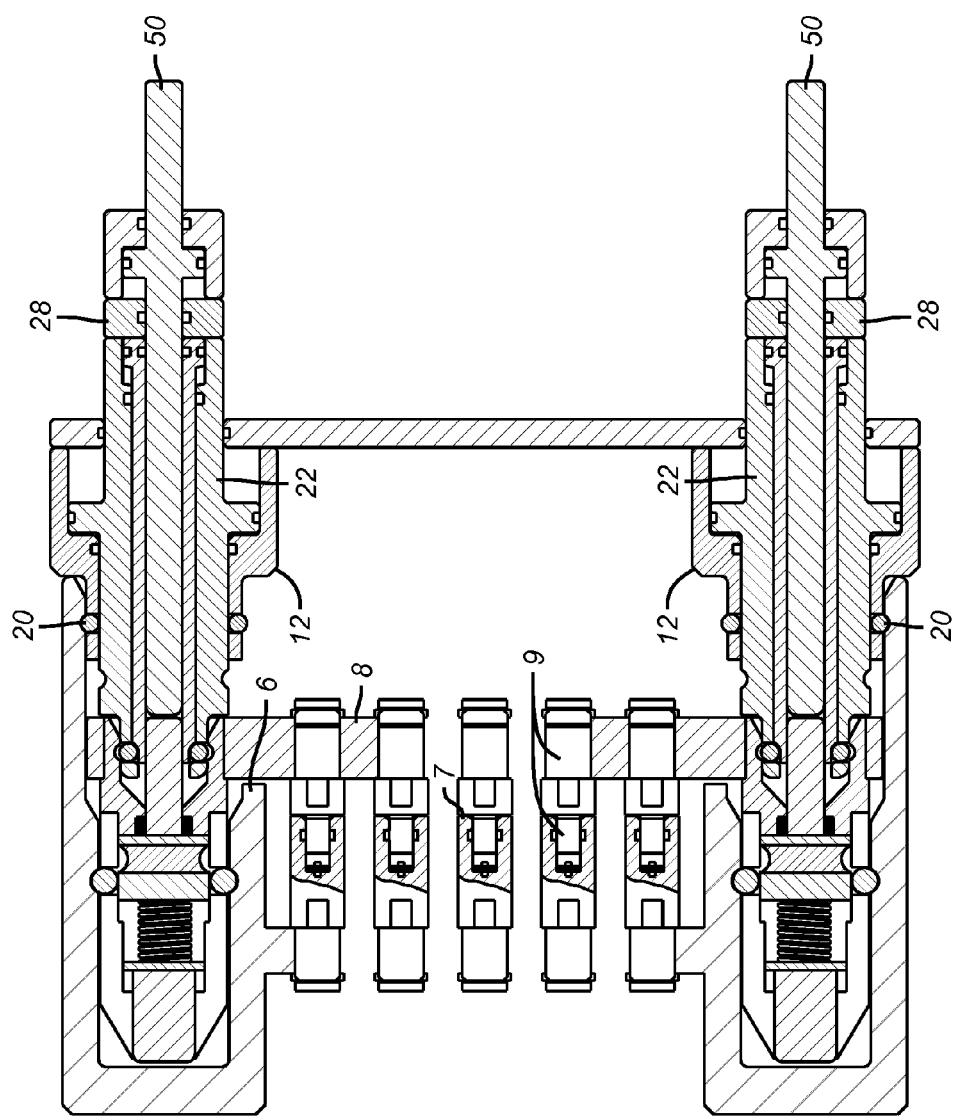
FIG. 5F is a side view of a sixth step of a method embodiment of the present invention using the running tool shown in FIGS. 3A-3B.
Figure 5G:
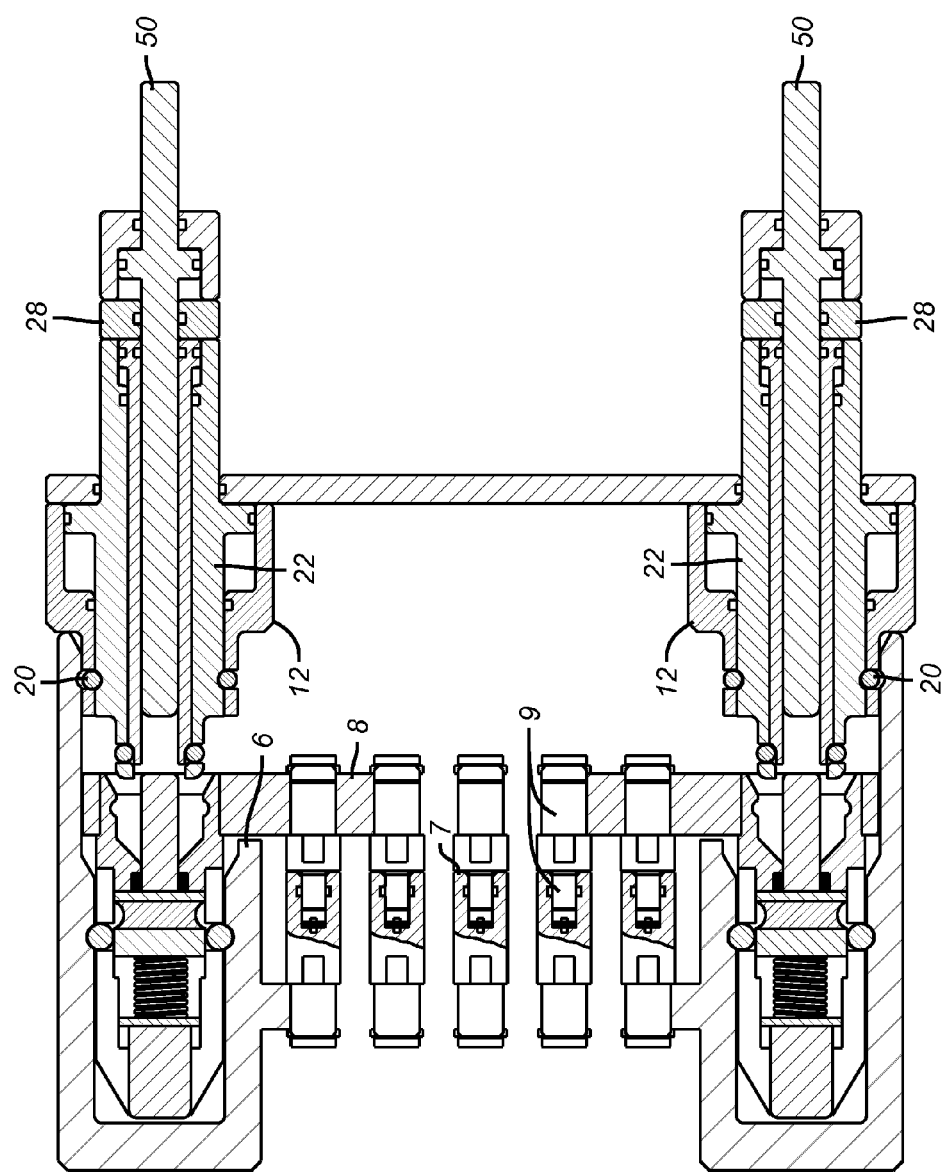
FIG. 5G is a side view of a seventh step of a method embodiment of the present invention using the running tool shown in FIGS. 3A-3B.
Figure 5H:
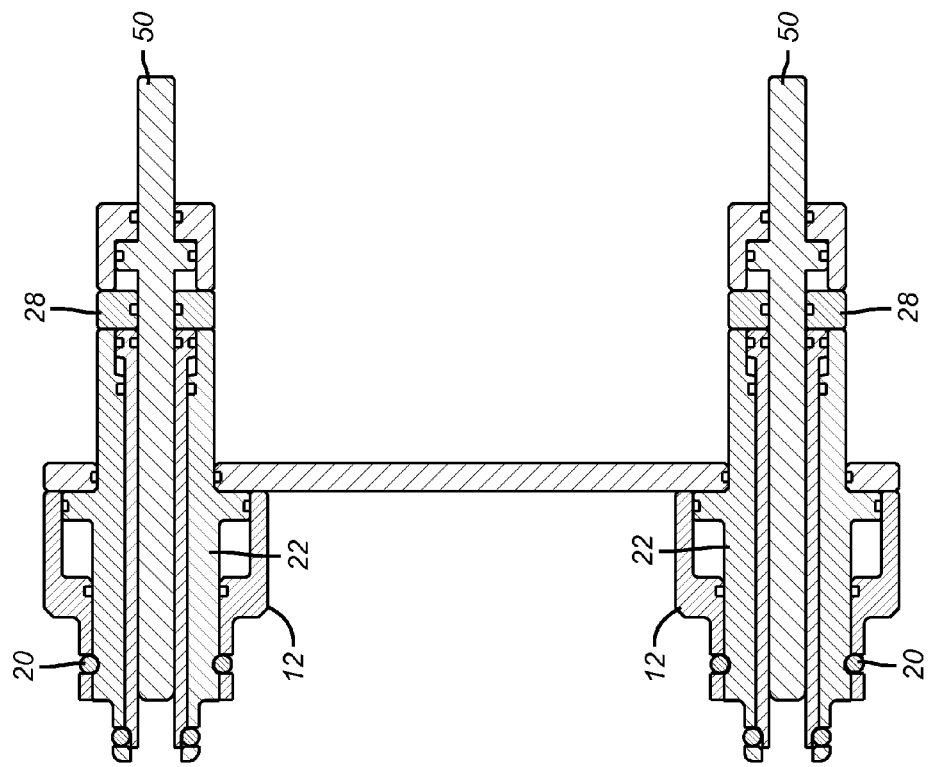
FIG. 5H is a side view of a eighth step of a method embodiment of the present invention using the running tool shown in FIGS. 3A-3B.
Figure 5H:
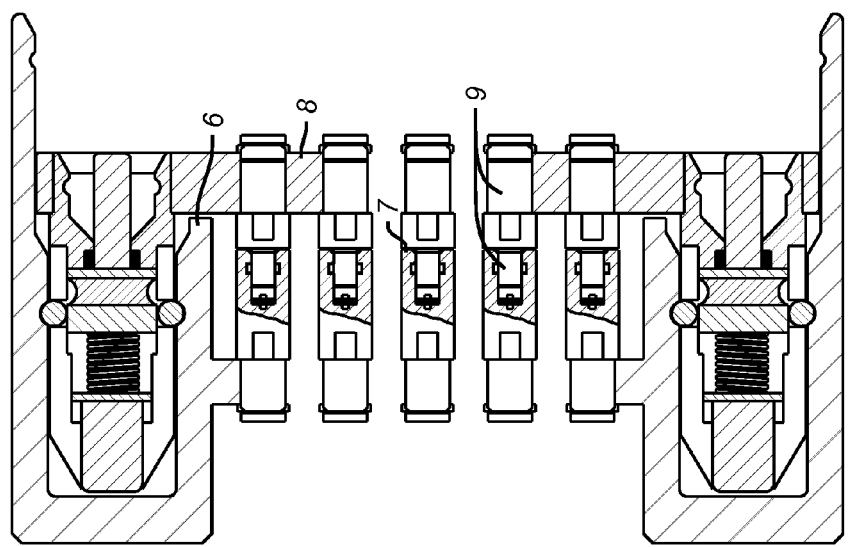

The method of the present invention comprises detaching the running tool from the moveable junction plate, as shown in Block 66 of FIG. 4 and in FIGS. 5F-5H. In a preferred embodiment, the detaching is accomplished by withdrawing the attachment member from the running tool receptacle as shown in Block 66 of FIG. 4. In the embodiment of the running tool shown in FIG. 3A, the injection of pressurized fluid into second fluid channel 17, second fluid port 25, and fourth fluid port 29 causes a withdrawal of the attachment member from the running tool receptacle. An advantage of the present invention is the detachable feature of the running tool, which permits a single running tool to be used repeatedly to couple a moveable junction plate to a fixed junction plate.

The foregoing disclosure and description of the inventions are illustrative and explanatory. Various changes in the size, shape, and materials, as well as in the details of the illustrative construction and/or a illustrative method may be made without departing from the spirit of the invention.

What is claimed is:

1. A junction plate assembly running tool, comprising:
   a. a central plate member having a first outer region and a second outer region opposite the first outer region;
   b. a first running tool housing connected to the first outer region and comprising a first longitudinal outer lock sleeve channel comprising a first pressure volume, said housing further comprising a first inner locking member port, a first outer locking ball port, a first fluid channel and a second fluid channel;
   c. a second running tool housing connected to the second outer region and comprising a second longitudinal outer lock sleeve channel comprising a second pressure volume, said housing further comprising a second inner locking member port, and a second outer locking ball port, a third fluid channel and a fourth fluid channel;
   d. a male locking member moveably mounted in each of said locking member ports;
   e. a first outer lock sleeve moveably mounted in said first longitudinal outer lock sleeve channel and comprising a first pressurization lip extending into the first pressure volume between the first and second fluid channels, a first plate lock sleeve channel, a first radial reducer region extending radially into said first pressurization region to define a first proximal pressure chamber comprising a first fluid port and a second fluid port, and a first distal pressure chamber, comprising a third fluid port and a fourth fluid port;
   f. a second outer lock sleeve moveably mounted in said second longitudinal outer lock sleeve channel and comprising a second pressurization lip extending into the second pressure volume between the third and fourth fluid channels, a second plate lock sleeve channel, a second radial reducer region extending radially into said second pressurization region to define a second proximal pressure chamber comprising a first fluid port and a second fluid port, and a second distal pressure chamber, comprising a third fluid port and a fourth fluid port;
   g. a first plate lock sleeve moveably mounted in said first plate lock sleeve channel and comprising a first piston channel, an extension end region comprising a first radial lip, and a tapered insertion end region opposite the extension end region;
   h. a second plate lock sleeve moveably mounted in said second plate lock sleeve channel and comprising a second piston channel, an extension end region comprising a second radial lip, and a tapered insertion end region opposite the extension end region;
   i. at least one male locking member mounted on each tapered insertion end region;
   j. a first piston moveably mounted in said first piston channel and comprising a proximal end region, a distal end region opposite said proximal end region, and a bulge region mounted in said first distal pressure chamber between the first and second fluid ports; and
   k. a second piston moveably mounted in said second piston channel and comprising a proximal end region, a distal end region opposite said proximal end region, and a bulge region mounted in said second distal pressure chamber between the first and second fluid ports.

2. The running tool of claim 1, further comprising a sealing member on each of said pistons.

3. The running tool of claim 2, further comprising a sealing member on each of said radial lips and in each of said outer lock sleeves.

4. The running tool of claim 1, further comprising a source of pressurized fluid connected to each of said fluid channels and each of said fluid ports.

5. A junction plate assembly running tool, comprising:
   a. a running tool housing comprising a longitudinal outer lock sleeve channel comprising a pressure volume, a inner locking member port, and an outer locking ball port, a first fluid channel and a second fluid channel;
   b. a male locking member moveably mounted in said locking member port;
   c. an outer lock sleeve moveably mounted in said longitudinal outer lock sleeve channel and comprising a pressurization lip extending into the pressure volume between the first and second fluid channels, a plate lock sleeve channel, a pressurization region, and a radial reducer region extending radially into said pressurization region to define a proximal pressure chamber comprising a first fluid port and a second fluid port, and a distal pressure chamber comprising a third fluid port and a fourth fluid port;
   d. a plate lock sleeve moveably mounted in said plate lock sleeve channel and comprising a piston channel, an extension end region comprising a radial lip, and a tapered insertion end region opposite the extension end region;
   e. at least one male locking member mounted on each tapered insertion end region; and
   f. a piston moveably mounted in said piston channel and comprising a proximal end region, a distal end region opposite said proximal end region, and a bulge region mounted in said first distal pressure chamber.

6. The running tool of claim 5, further comprising a sealing member on said piston.

7. The running tool of claim 6, further comprising a sealing member on said radial lip and in said outer lock sleeve.

8. The running tool of claim 5, wherein each male locking member is a ball.

9. A method of coupling a fixed junction plate to a moveable junction plate, comprising:
   a. inserting an attachment member of a running tool into a running tool receptacle on a moveable junction plate;
   b. maneuvering the running tool with attached moveable junction plate into a position where a coupling member of the moveable junction plate is received by a coupling receptacle on a fixed junction plate;
   c. locking the moveable and fixed junction plates together; and
   d. detaching the running tool from the moveable junction plate.

10. The method of claim 9, wherein the inserting is accomplished using pressurized fluid from a source mounted on an underwater vehicle.

11. The method of claim 10, wherein the underwater vehicle is a remotely operated vehicle.

12. The method of claim 11, wherein the maneuvering is accomplished using a manipulator arm attached to an underwater vehicle.

13. The method of claim 9, wherein the detaching is accomplished by withdrawing the attachment member from the running tool receptacle.

14. A junction plate assembly running tool, comprising:
a. an outer body;
b. a retractable coupling device attached to said body and adapted to be selectively coupled to a coupling receptacle in a moveable junction plate;
c. a locking mechanism positioned to selectively lock the coupling device to a moveable junction plate; and
d. a force translation system comprising a threaded lead screw and adapted to receive an external force and apply such force to drive a moveable junction plate into a coupled relationship with a fixed junction plate.

15. The junction plate assembly running tool of claim 14, wherein the retractable coupling device is a piston moveably mounted in a reciprocating sleeve.

16. The junction plate assembly running tool of claim 15, wherein the locking mechanism is a retractable insertion member.

17. The junction plate assembly running tool of claim 16, wherein the force translation system comprises a hydraulically driven piston and a source of pressurized hydraulic fluid.

18. The junction plate assembly running tool of claim 17, wherein the source of pressurized hydraulic fluid in mounted on an underwater vehicle.

19. The junction plate of claim 14 wherein the force translation system comprises a torque receiving member attached to one end of the lead screw.

20. A junction plate assembly running tool, comprising:
a. an outer body;
b. a retractable coupling device attached to said body and adapted to be selectively coupled to a coupling receptacle in a moveable junction plate;
c. a locking mechanism positioned to selectively lock the coupling device to a moveable junction plate;
d. a force translation system adapted to receive an external force and apply such force to drive a moveable junction plate into a coupled relationship with a fixed junction plate; and
e. a torque receiving member attached to the force translation system.

21. The junction plate assembly running tool of claim 20, wherein the locking mechanism comprises a tapered region sized and positioned to receive a male locking member.

22. The junction plate assembly running tool of claim 20, further comprising a moveable junction plate coupled to the retractable coupling device.

* * * * *